United States Patent [19]
Fowler et al.

[11] Patent Number: 5,572,709
[45] Date of Patent: Nov. 5, 1996

[54] USING DYNAMICALLY-LINKED LIBRARIES TO ADD SIDE EFFECTS TO OPERATIONS

[75] Inventors: Glenn S. Fowler, Scotch Plains; Yennun Huang, Bridgewater, both of N.J.; David G. Korn, New York, N.Y.; Chung-Hwa H. Rao, Edison, N.J.

[73] Assignee: Lucent Technologies Inc., Murray Hill, N.J.

[21] Appl. No.: 80,037

[22] Filed: Jun. 18, 1993

[51] Int. Cl.⁶ .............................. G06F 9/44; G06F 9/455
[52] U.S. Cl. ...................... 395/500; 395/183.05; 395/600
[58] Field of Search ..................................... 395/600, 500, 395/700, 525, 182.05, 183.04, 183.05; 371/10.1

[56] References Cited

U.S. PATENT DOCUMENTS

| | | | |
|---|---|---|---|
| 5,109,515 | 4/1992 | Laggis et al. | 395/725 |
| 5,133,065 | 7/1992 | Cheffetz et al. | 395/575 |
| 5,146,593 | 9/1992 | Brandle et al. | 395/700 |
| 5,247,681 | 9/1993 | Janis et al. | 395/700 |
| 5,371,885 | 12/1994 | Letwin | 395/600 |
| 5,375,241 | 12/1994 | Walsh | 395/700 |
| 5,388,260 | 2/1995 | Monahan et al. | 395/600 |

FOREIGN PATENT DOCUMENTS

| | | | |
|---|---|---|---|
| 2251502 | 11/1991 | United Kingdom | G06F 11/16 |

OTHER PUBLICATIONS

E. Krell and B. Krishnamurthy, "COLA:Customized Overlaying", Proceedings of USENIX San Francisco Winter 1992 Conference, San Francisco, CA, 1992, pp. 3–7.

J. H. Saltzer, D. P. Reed, and D. D. Clark, "End–To–End Arguments in System Design", ACM Transactions on Computer Systems, vol. 2, No. 4, Nov. 1984, pp. 277–288.

G. Fowler, Y. Huang, D. Korn, H. Rao, "A User–Level Replicated File System", Conference Proceedings of Summer Usenix, Cincinnati, OH, 1993; (no apparent pagination).

Y. Huang, C. Kintala, "Software Implemented Fault Tolerance", 1993 Fault Tolerant Computing Symposium (FTCS23), Jun. 1993; (no apparent pagination).

M. L. Kazar, B. W. Leverett, O. T. Anderson, V. Apostolides, B. A. Bottos, S. Chutani, C. F. Everhart, W. A. Mason, S–T. Tu, E. R. Zayas, "DEcorum File System Architectural Overview"; 1990; pp. 1–15.

A. Bhide, E. Elnozahy, S. P. Morgan, "A Highly Available Network File Server", Usenix Conf. Proceedings, pp. 199–205, Jan. 1991.

D. Bitton, J. Gray, "Disk Shadowing" Proceedings of 14th Conf. on Very Large Data Bases, pp. 331–338, Sep. 1988. (On Order).

(List continued on next page.)

*Primary Examiner*—Paul V. Kulik
*Attorney, Agent, or Firm*—Gordon E. Nelson

[57] ABSTRACT

A backup file system which can be used without modification of application programs, the operating system, or the hardware. The backup file system is implemented by means of a dynamically-linkable replacement library and user-level processes on a primary computer system and a backup computer system. The dynamically-linkable replacement library has the same interfaces as a standard dynamically-linkable library of file operations. The functions in the replacement library perform the same file operations as their counterparts in the standard library; in addition, they send messages specifying the just-performed operation to a user-level process on the backup computer system. The user-level process executes the operation specified in the message on a backup file in the backup computer system. The files to be backed up are specified by identifying subtrees in the namespace of the primary file system; the subtrees make up a user-defined namespace. The backup file system is made fault tolerant by the use of monitor processes which monitor the backup computer system and the processes of the backup file system and deal with failures as required to keep the backup file system operating.

13 Claims, 5 Drawing Sheets

OTHER PUBLICATIONS

R. Guy, J. S. Heidemann, W. Mak, T. W. Page, Jr., G. J. Popek, D. Rothmeier, "Implementation of the Ficus Replicated File System" Usenix Conference Proceedings, pp. 63–71, Jun. 1990.

A. D. Birrell, A. Hisgen, C. Jerian, T. Mann and G. Swart, "The Echo Distributed File System", Digital Equipment Corp. Technical Report, 1991, pp. 1–6.

M. Satyanarayanan, J. J. Kistler, P. Kumar, M. E. Okasaki, E. H. Seigel, D. C. Steere, "Coda: A Highly Available File System for a Distributed Workstation Environment", IEEE Transactions on Computers, Special Issue on Fault–Tolerant Computing, 39(4):447–459, Apr. 1990.

A. Hisgen, A. Birrell, T. Mann, M. Schroeder, G. Swart, "Availability and Consistency Traadeoffs in the Echo Distributed File System", Second Workshop on Workstation Operating Systems, pp. 49–54, Sep. 1989; reprinted IEEE, pp. 1–6.

K. Marzullo, F. Schmuck, "Supplying High Availability with a Standard Network File System", IEEE, 1988, pp. 447–453.

A. Bhide, S. P. Morgan, E. N. Elnozahy, A. Siegel, "A Comparison of Two Approaches to Build Reliable Distributed File Servers", IEEE, 1991, pp. 616–623.

Gordon Letwin, INSIDE OS/2, "Dynamic Linking", 1988, Microsoft Press, Redmond, Washington, pp. 89–116.

```
           603                   605
INT<APP-PROG-FILE-OP>(<APP-CODE-FILE-OP-ARGS>)
{     607                 609
      IF <SERVER-FILE-OP>(<SERVER-FILE-OP-ARGS>)
             613              614
             IF IN-REP-TREE(<FILE-ARG>)
                   615            617
  611 {          { SEND-MESSAGE(<MESSAGE-ARGS>)
                   RETURN (SUCCESS)
                 }
             ELSE
                   RETURN (SUCCESS)
      ELSE
             RETURN (EN-CODE)
}
```

601

USING DYNAMICALLY-LINKED LIBRARIES TO ADD SIDE EFFECTS TO OPERATIONS

BACKGROUND OF THE INVENTION

1. Field of the Invention

The invention relates to computer systems generally and more specifically to techniques used at the application program level of the system for modifying the effects of calls made to the operating system.

2. Description of the Prior Art

Computer systems are layered. In a typical system, the layers include a bottom layer of hardware: the processors, the memories, the mass storage devices, and the communications media which link these components. The next layer is the operating system. The operating system controls the operation of the hardware and defines a set of logical devices. Operations on the logical devices become operations in the hardware controlled by the operating system. The logical devices provided by the operating system are used by programs in layers above the operating system. These layers are termed the user level of the system.

An important issue in the design of computer systems is the level at which operations performed by the system are defined. For example, an operating system may provide a rich set of logical devices to the application program level, or it may provide a smaller set of primitive logical devices and expect the users' applications programs to combine the primitive devices as required to perform its operations. The same is the case with the hardware. The design trade off at each level is the same: the rich set of logical devices simplifies programming at the next level, but increases the complexity of the level providing the logical devices and decreases the overall flexibility of the system. In particular, when complex operations are performed at lower layers of the system, they are necessarily done without the benefit of information available at the higher layers. The design issue just outlined in discussed in detail in J. H. Saltzer, D. P. Reed, and D. D. Clark, "End-to-End Arguments in System Design", *ACM Transactions on Computer Systems*, Vol. 2, No. 4, Nov. 1984, pp. 277–288.

An example of the tradeoffs is provided by the design of backup file systems. A backup file system provides a backup of part or all of another file system. Since it is the system which is being backed up, the backup file system preserves not only file contents, but also the name by which the file is known within the portion of the system being backed up. There are many situations where it is desirable that an operation performed on a file be duplicated on a file in a backup file system. When a backup file system exists, there is no information loss if the original file system is destroyed or becomes inoperable. Further, since the backup system preserves names as well as contents, the backup file system is available for immediate use by a program which used the failed file system. It is of course always possible for an application program to create its own backup file system; however the preferred solutions to the backup file system problem have always been those which could make backups without modification.

FIG. 1 shows prior-art approaches to the design of backup file systems. In multiprocess computer systems, the file system performs operations on files in response to operations specified by programs which run in application processes. The file system itself is implemented using at least one operating system process and hardware such as disk drives. The relationship between the application process and the operating system process is that of client and server: the application process requests that the server process perform an operation and return the result of the operation to the application process. Thus, in system 101, application process 103 requests that kernel server 113 perform file operations 109, and kernel server 109 performs the operations and returns results 111. Kernel server 109 of course performs the operations by modifying data in disk drive 117. The interface between disk drive 117 and kernel server 113 is a component of kernel server 113 termed a driver 115 which is specific to a given type of disk drive 115.

In the prior art, backup file systems have been implemented at hardware level 109 and at operating system level 107. System 101 of FIG. 1 is implemented at hardware level 109. Disk drive 117 appears to server 113 as an ordinary disk drive; however, it contains mirrored disks 119(*a*) and 119(*b*); each file has a copy on both disks, and any operation which alters the file is performed on the copy on each disk. Each disk thus contains a copy of the file system. If one of the disks fails, the file system on the other disk is still available. A particular drawback of system 101 is of course the fact that special hardware is required.

Backup file systems 121 and 123 are implemented at the operating system level. System 121 has two non-mirrored disks 123(*a*) and 123(*b*); each disk 123 has a separate driver 115(*a*) and 115(*b*). When server 113 performs a file operation which creates, deletes, or other modifies a file, it causes driver 115(*a*) to perform the operation on drive 123(*a*) and driver 115(*b*) to perform the operation on drive 123(*b*); there are consequently identical copies of the file system on drive 123(*a*) and drive 123(*b*). System 121 no longer requires special hardware, but it still requires a modified operating system. Further, since the modifications must be made with regard to drivers 115(*a*) and (*b*), they must be made at the lowest layer of kernel server 113.

Backup file system 123 also has two non-mirrored disks 123(*a*) and (*b*), but each is driven by separate servers 125 and 127. Server 125 performs file operations 109 on primary disk 123(*a*); if the file operation creates, deletes, or otherwise modifies a file, server 125 also sends a file operation message to backup server 127, which then performs the same file operation, so that there is a copy of the file system currently being used by application process 103 on both disk drive 123(*a*) and disk drive 123(*b*). File backup system 123 is typically implemented in a distributed computing system which includes a number of component computing systems 131; in such a system, application process 103, kernel server 125, and disk drive 123 are generally on one component system 131(*a*), while backup server 127 and disk drive 123(*b*) are on another component system 131(*b*). Like system 121, system 123 requires modification to the operating system; however, all that is required is to modify server 125 to send messages to server 127 whenever it modifies a file for application process 103. Backup server 127 responds to the messages in exactly the same way in which it responds to file operations 109 from other processes on component system 131(*b*).

While any of systems 101, 121, and 123 is effective in creating backup files, all of them have important drawbacks. First, they require either special hardware or modifications to the ,operating system, and consequently are not portable. If the computer system upon which these systems is to run do not have the special hardware or the special operating system, these components must be acquired; moreover, once system 101, 121, or 123 is in use, any replacement computer system must have the special hardware or special operating system.

Second, because the systems 101, 121, and 123 operate at the hardware level 109 or the operating system level 107, all files appear equal to them and they simply backup every file modified by application process 103. Backing up every file is however generally unnecessary. Analysis of files in the UNIX® operating system has shown that 50–60% of the files in the file system are temporary working files with a lifetime of less than three minutes. In many cases, most of these files do not need to be backed up, but there is no way to identify such files to kernel server 113. Of course, making unnecessary backups is a waste of both system computing resources and system storage resources.

The unnecessary backups are a special case of the general problem alluded to above: that the further from the user an operation is performed, the less information about the operation is available to the system. As shown in the case of the backups, the result is very often inefficient use of system resources.

It is thus an object of the invention to provide systems in which operations in which user information is useful are performed at the user level without modifications of the application program and in particular to provide a backup file system which operates at the user level and is therefore both portable and able to take advantage of user information about the files to be backed up.

SUMMARY OF THE INVENTION

The foregoing problems are solved by the user-level backup file system disclosed herein. The backup file system replaces a standard set of library routines which provide file commands to the kernel server with a set of library routines which emulate the operations of the standard set of library routines and also handle the backup file system. When an application program specifies an operation which modifies a file, the replacement library routine for the operation performs the operation. The replacement library routine does two things: it has the kernel server perform the specified operation and it provides a message specifying the operation actually performed by the kernel server to a user-level back end server on another computer system. The user-level back end server then provides the file operation specified in the message to the kernel server on the other computer system. The creation and maintenance of backup files thus becomes a side effect of the file operations performed by the replacement library routines. Because all of the components of the backup file system are at the user level and the replacement library emulates the library originally used by the application program, the system can be employed without modification of the hardware, the operating system, or the application program and can be used on any system which can execute the routines in the replacement library.

An added advantage of the user-level backup file system is that it permits client process 303 to specify which files are to be backed up. The specification is done by means of a replicated tree data structure which specifies those pans of the file system accessible to client 303 which contain the files to be backed up. Code in the library routines which emulate the file operations check the replicated tree data structure to determine whether the file upon which they are performing the operation is to be backed up. If it is, and if the operation modifies the file, the message containing the file operation is sent to the back end server process. The combination of library routines which specify side effects of operations on certain kinds of entities and a data structure which specifies which of the entities are to be affected by the side effects may be generally employed to permit user-level redefinition of functionality provided by lower levels of the computer system. For instance, the technique may be used to define a user-level logical file system and map the user-level logical file system onto the file system provided by the operating system. The foregoing and other objects and advantages of the invention will be apparent to one of ordinary skill in the art who peruses the following Drawing and Detailed Description, wherein:

Figure 1:
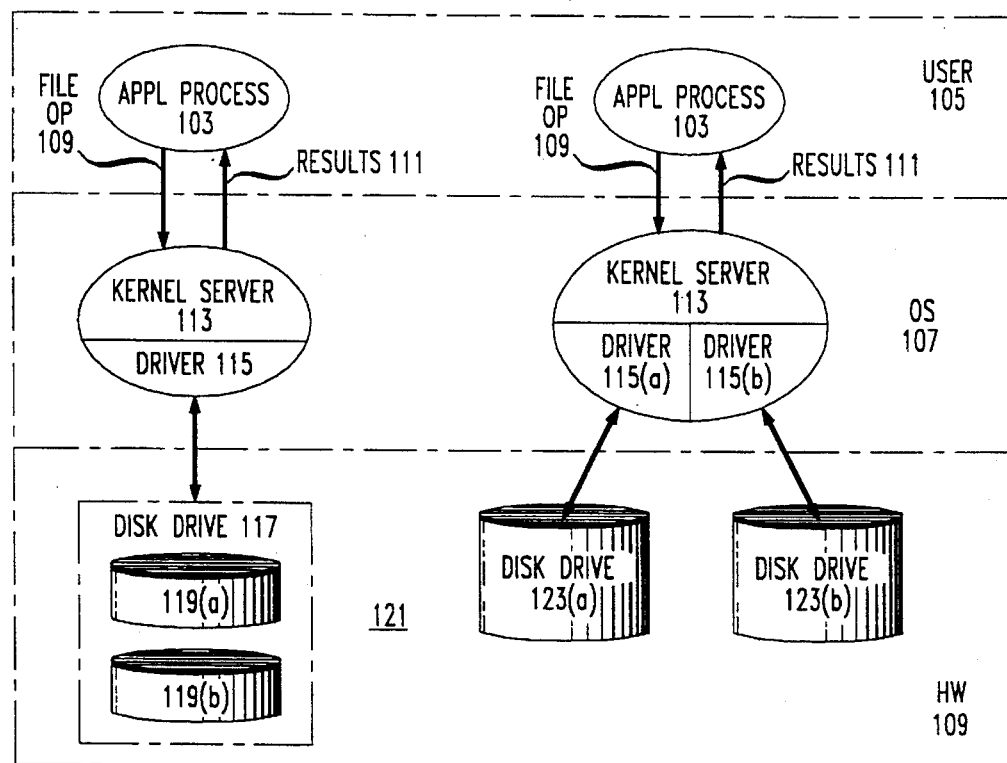
FIG. 1 presents block diagrams of prior-art backup file systems.
Figure 1:
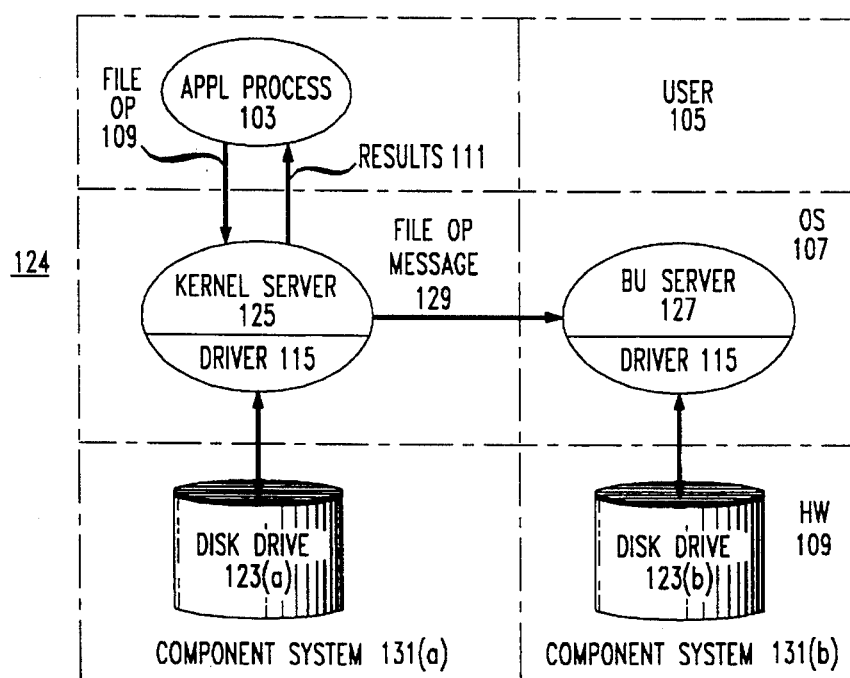

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

The following Detailed Description will first provide a general overview of how libraries can be used to redefine interfaces, will then show how dynamically-linked libraries can be used to create a user-level backup file system, and will finally describe a preferred embodiment of a fault-tolerant user-level backup file system in detail.

Figure 2:
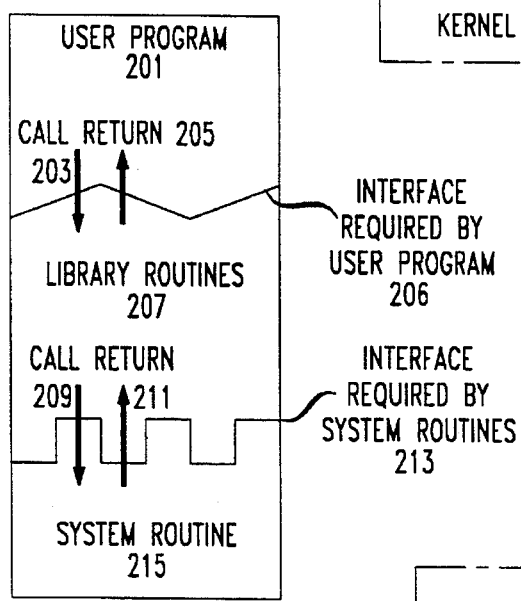
FIG. 2 presents an overview of how a library can redefine an interface for a user program.

Using Libraries to Modify Interfaces: FIG. 2

As already explained, computer systems are layered. Each layer presents an interface to the next higher layer. The higher layer specifies operations to be performed by the lower layer as required by the lower layer's interface. If the higher layer does not conform to the interface required by the lower layer, an adapter layer must be added between the higher layer and the lower layer. The purpose of the adapter layer is to translate operation specifications made according to the interface expected by the higher level into the operation specifications required by the lower layer's interface. Using this technique, it is for example possible to make a PC running the MSDOS operating system appear to its user to be a computer running the UNIX operating system.

When an adapter layer is required by a great many application programs, it is often implemented as a set of library routines. As the name implies, library routines are routines which the makers of a subsystem of a computer system provide to users of the computer system to use with their application programs. FIG. 2 shows how library routines may be used to make an adapter layer. User program 201 has an interface 206 to the next layer, in this case, a set of system routines. However, the system routines in the computer system in which user program 201 is to be employed have interface 213; the differences between interface 206 and interface 213 are represented in FIG. 2 by the different forms of the lines representing the interfaces. The adapter layer consists of library routines 207, which have interface 206 for the next layer up required by user program 201 and interface 213 for the next layer down required by system routines 205. The interfaces consist in fact of function invocations, and the routines in library routines 207 work by responding to a function invocation 203 required by interface 206 by producing the function invocations which are required by interface 213 to perform the operation specified by function invocation 203. When the system routines 215 are finished, they return the results of their execution to the library routines 207, as shown by arrow 211, and the library routines 211 in turn return the results to user program 201, as indicated by return 205.

Using Dynamically-Linked Library Routines to Redefine Interfaces

The usefulness of library routines for redefining interfaces was limited in traditional systems by the fact that the library routines had to be linked to the user program 201 when the executable code for the user program 201 was produced. Linking in this context is the process by which an invocation of a library routine in user program 201 is related to the location of the library routine in a copy of library routines 207. Since the linking had to be done when the executable code was produced, it was not possible for a user who had only a copy of the executable code to replace one set of library routines 207 with another set of library routines 207.

Computer systems have now been developed in which library routines may be dynamically linked to user programs. In such computer systems, the linking is done when the process which executes a user program is loaded into the memory of the computer system prior to execution. With dynamic linking, it is possible without altering the object code of the user program to replace one set of library routines with another and thereby to alter the behavior of the system upon which the user program is operating. A description of dynamic linking may be found in *Shared Libraries*, Sun Microsystems, Inc., Mountain View, Calif., May 1988.

Figure 3:
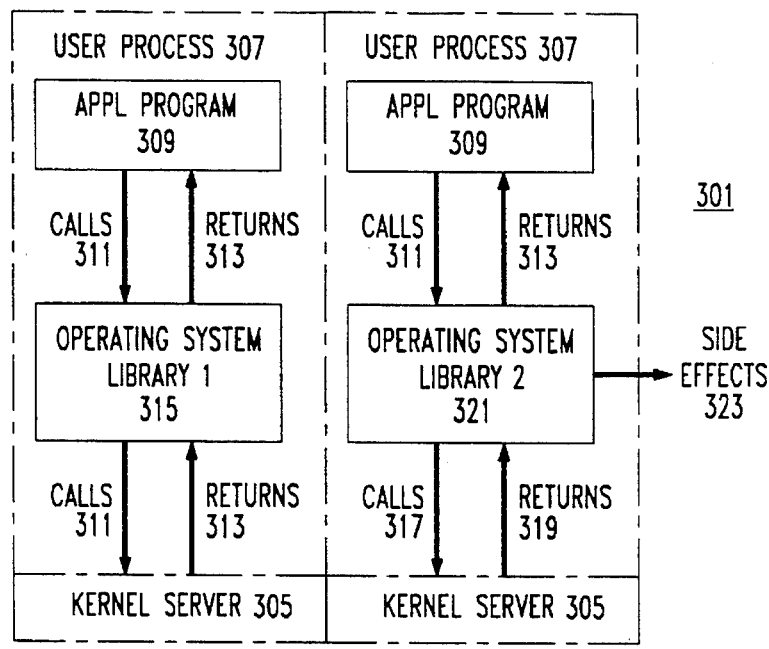
FIG. 3 shows how a dynamically-linked library can be used to redefine an operating system interface.

FIG. 3 shows how dynamic linking may be used to alter a system's behavior. In system 1 301, user process 307 is executing an application program 309 to which operating system library 1 315 has been dynamically bound. Operating system library 1 315 provides the interface to application program 309 indicated by calls 311 and returns 313 and uses calls 317 to kernel server 305 and returns 319 from kernel server 305 to carry out the operations specified by calls 311. In system 2, user process 307' is executing the same application program 309 and using the same kernel server 305, but this time, operating system library 2 321 has replaced operating system library 1 315. Operating system library 2 321 does all the things operating system library 1 315 does; however, it additionally produces side effects 323. Thus, all that is necessary to transform system 301 into a system 303 which behaves like system 301 but also produces side effects 323 is to dynamically link operating system library 2 321 to user program 309 in place of operating system library 1 315.

Using Dynamically-Linked Libraries to Create User-Level Namespaces

Figure 4:
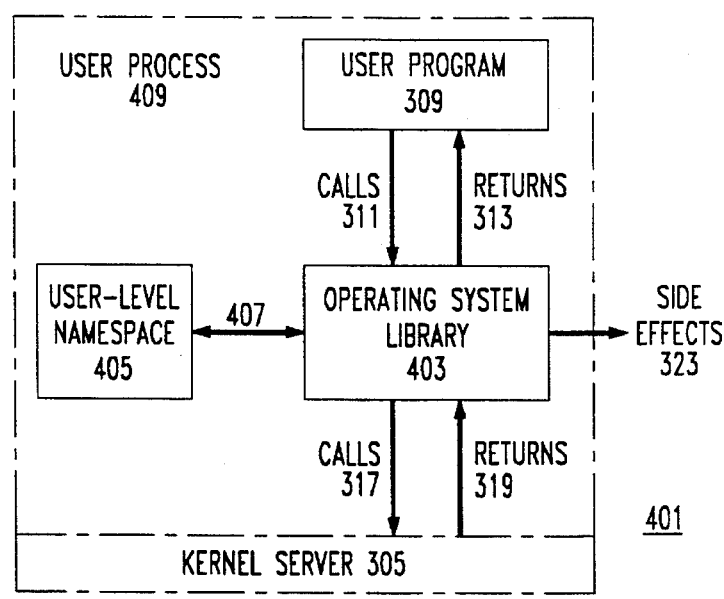
FIG. 4 shows how a dynamically-linked library can be used to provide a user-level namespace.

FIG. 4 shows further how a dynamically-linked operating system library 403 may be used to create a user-level namespace 405 and the user-level namespace 405 may be used to control side effects 323. Entities in computer systems such as functions, files and devices are referred to in programs by names, and it is the function of a computer system's namespace to relate the names used in the programs to the entities represented by the names. In prior-art computer systems, the namespace employed by a user program is created and maintained by the operating system; in system 401, operating system library 403 creates and maintains one or more user-level namespaces 405 for user process 409. One way in which user-level namespace 405 can be employed by library routines 403 is to create a user-level logical file system which is different in behavior, structure, or both from the file system provided user program 309 by kernel server 305. The logical file system may then be used to control side effects 323. For example, if system 401 is a backup file system, the side effects 323 may be those required to produce a backup file system and user-level namespace 405 may specify which files in the file system provided by kernel server 305 are to be backed up in the backup file system. As is apparent from FIG. 4, user-level namespace 405 is part of the environment of user process 409.

Figures 5, 6:
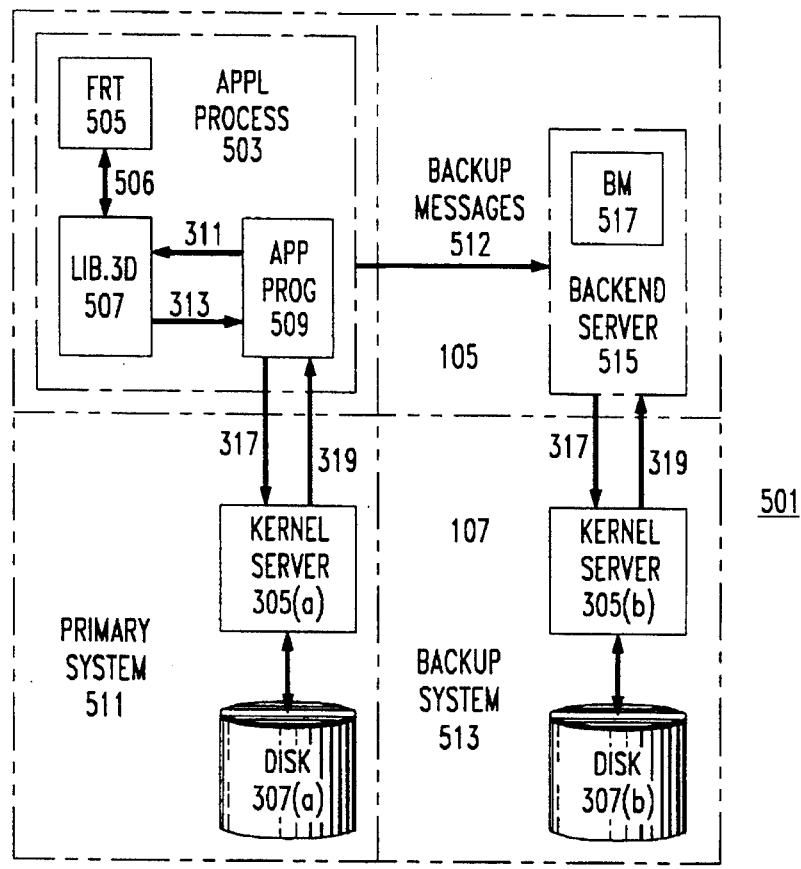
FIG. 5 is an overview of a user-level backup file system employing a dynamically-linked library.
FIG. 6 is an overview of a routine in the dynamically-linked library.

Overview of the User-Level Backup File System: FIGS. 5–6

The dynamically-linked libraries and user-level namespace just described may be employed to make a user-level backup file system which automatically backs up only selected ones of the files modified by an application process running an application program. FIG. 5 shows such a user-level backup file system 501. System 501 is implemented in two computer systems: primary system 511, upon which application process 503 runs, and backup system 513, upon which backup copies of the files modified by application process 503 are maintained. Primary system 511 and backup system 513 are connected by a communications medium by means of which messages from processes running on primary system 511 can be sent to processes running on backup system 513.

The components of system 501 on primary system 511 are application process 503 and kernel server 305(*a*). Kernel server 305(*a*) provides a file system to primary system 511. In FIG. 5, the file system is represented by disk 307(*a*) local to primary system 511, but it may also be a remote file system located on another system altogether. In either case, kernel server 305(*a*) performs file operations on the file system it provides in response to calls 317 from application process 503 and returns results 319 to process 503 and itself performs the necessary operations on disk 307(*a*). Application process 503 employs a dynamically linkable library to perform file operations involving kernel server 305(*a*). In primary system 511, this library has been replaced by a new library called lib.3d 507. Library 507 responds to calls 311 specifying file operations which modify certain files by not only providing the proper call 317 to kernel server 305, but by also sending a backup message 512 to backup system 513. The files whose modification result in the sending of a backup message 512 are specified in front-end replicated trees (FRT) 505, which is maintained and used by routines in lib.3d 507, as shown by arrow 506. Replicated trees 505 thus defines a user-level logical file system consisting of files upon which modifications result in modifications to backup files on system 513.

The components of system 501 on backup system 513 are back end server 515, a user-level process, and kernel server 309(b) and disk 307(b), the standard file system server and disk drive for backup system 513. Kernel server 305(b) provides a file system to backend server 517. In FIG. 5, the data for the file system is stored on local disk 307(b); it may however be stored on a remote system. Back end server 515 performs file operations by means of calls 317 to kernel server 305(b) and receives results of the calls from server 305(b). Back-end server 515 maintains backend map 517, which maps the files specified by front-end replicated trees 505 onto the files in backup system 513's file system which serve as their backups. In an embodiment in which the file system produced by kernel server 305(a) and the file system produced by kernel server 305(b) have identical namespaces, back end map 517 may not be needed.

How system 501 operates is apparent from FIG. 6, which provides a general overview of the form of a routine 601 in library 507 which modifies a file. The routine name 603 and the arguments 605 which the routine takes are the same as the name and arguments for the function used to perform the file operation in the library which library 507 replaced; consequently, invocations of that routine in application program 509 invoke routine 601. After having performed whatever preliminaries are necessary, routine 601 has kernel server 305(a) perform the same file operation as the routine replaced by routine 601. If the operation succeeds, routine 613 invokes a function 613 with the name of the file being modified to determine whether front-end replicated tree 505 indicates that the file being modified is to be backed up. If front-end replicated tree so indicates, function 615 sends a message 512 with arguments 617 to backup system 513 which requests that backup system 513 perform exactly the same operation on the backup file system as was just performed on the file system provided by server 305(a). After sending the message, routine 601 returns, which it also does if the file is not in front-end replicated tree 505 or if the operation specified in function 607 did not succeed. The section of the code labelled 611 in FIG. 6 specifies the side effect (in this case the message 512). A feature of routine 601 which is worthy of mention here is that the message 512 is sent to backup system 513 only if the file operation succeeds in primary system 511, since an unsuccessful operation need not be backed up.

There are two general classes of file operations in system 501: those which modify the user-level namespace 405 implemented by front-end replicated tree 505 and backend map 517 and those which do not. An example of the second class of operation is a write to a file which is specified in front-end replicated tree 505. The write function in lib.3d 507 has the same interface as the write function in the library which lib.3d replaced; in a preferred embodiment, it takes as arguments an integer file descriptor which is used by kernel server 305(a) to identify the file, a pointer to a buffer containing the data to be written, and an integer indicating the size of the data to be written. The write function in lib.3d requests that kernel server 305(a) perform a system write operation on the file specified by the file descriptor; if the operation succeeds, the function checks whether the file identified by the file descriptor is in front-end replicated tree 505; if it is, the function sends a write message 512 to backend server 515 in backup system 513 and returns. The message identifies the file just written by kernel server 305(a) and includes the information required to perform exactly the write operation in the backup file system that was just performed by the system write operation in the file system provided by kernel server 305(a). When backend server 515 receives the message, it uses backend map 517 to determine the file descriptor which kernel server 305(b) uses for the backup file and then uses the system write function provided by kernel server 305(b) to perform the write operation on the backup file using the data and position information provided in the message.

A simple case of an operation which alters the user-level namespace 405 is file deletion. The delete function provided by lib.3d first requests kernel server 305(a) to delete the file; when that is done, the delete function checks whether information about the deleted file needs to be removed from front end replicated trees 505; if so, it removes the information. Next, it sends the messages required for the deletion to backend server 515 and returns; when backend server 515 receives the messages, it locates the file in backend map 517 and requests that kernel server 305(b) delete the file, as well as performing any operations on backend map 517 required by the deletion.

A more complicated example is a rename. Renaming a file in the file system provided by kernel server 305(a) can have three possible consequences in user-level namespace 405:

1. If the file's old name is part of user-level namespace 405 and the new name is also part of user-level namespace 405, the file remains in user-level namespace 405;

2. If the file's old name is not part of user-level namespace 405 and the new name is, the file is added to user-level namespace 405; and 3. If the file's old name is part of user-level namespace 405 and the new name is not, the file is removed from user-level namespace 405.

In the first case, the rename function of lib.3d requests that kernel server 305(a) do the rename in its file system. It then checks whether the renamed file is in user-level namespace 405, and if it is, the rename function alters front-end replicated trees 505 to reflect the change, sends a message to backend server 515 requesting the rename there, and returns. The message of course includes the old and new pathnames. When backend server 515 receives the message, it requests the rename of kernel server 305(b).

In the second case, the rename function requests the rename from server 305(a) and checks whether the renamed file is in user-level namespace 405 as before, but this time it removes the information for the renamed file from front-end replicated trees 505, sends a message to backend server 515, and returns. The message to backend server 515 is a delete message for the file. In response to the message, backend server 515 has kernel server 305(a) delete the backup file.

In the third case, the rename function again requests the rename as before, but this time, two messages must be sent: the first message requests that a file having the name of the file which has been moved into user-level namespace 405 be created in backup system 513; backend server 515 responds to this message by requesting that kernel server 305(b) create the file and then making an entry for the file in backend map 517; then the rename function sends a write message with the current contents of the file which has been moved into user-level namespace 405; backend server 515 responds to the write message by having kernel server 305(b) write the contents to the backup file in backup system 513.

As may be seen from the foregoing, a single operation performed by kernel server 305(a) in primary system 511 may require that backend server 505 have kernel server 305(b) perform a sequence of operations. As may further be seen, at the end of an operation performed by a function in lib.3d 507, backend map 517 and front-end replicated trees 505 are always in the same state.

Implementation of a Preferred Embodiment: FIGS. 7–11

Figure 7:
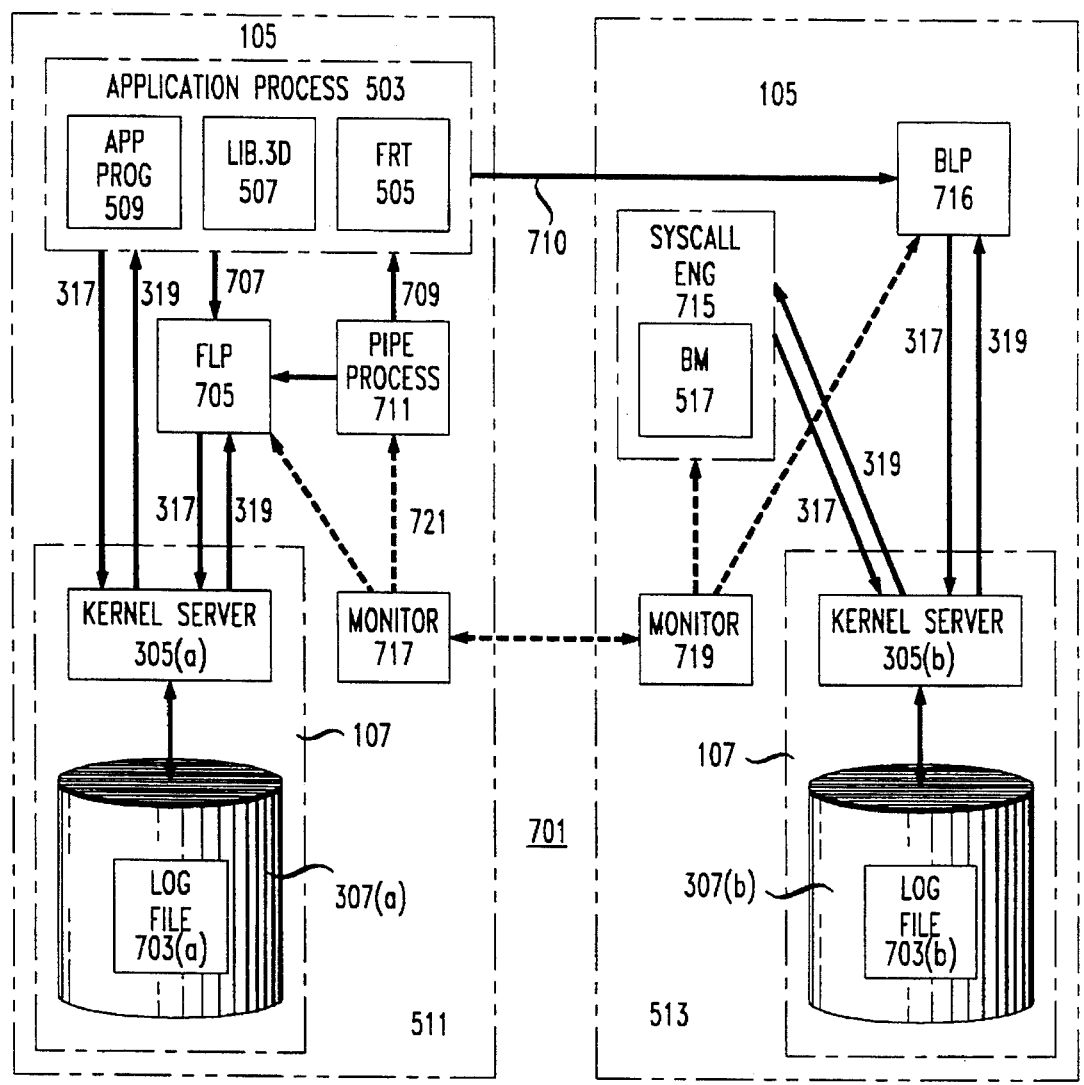
FIG. 7 is an overview of a preferred embodiment of the user-level backup file system.

FIG. 7 is a detailed block diagram of a preferred embodiment 701 of the user-level backup file system. The preferred embodiment was implemented in a system in which one processor was running the Sun OS 4.1 version of the UNIX® operating system and the other was running the MIPS 4.5 version of the UNIX operating system. There are two groups of components in system 701: those which perform the backup file operations and those which make system 701 fault tolerant. The following discussion will first explain the components which perform the backup file operations and then those which provide fault tolerance.

Beginning with primary system 511, application process 503 includes application program 509, the dynamically linkable library lib.3d 507, whose functions perform backup file operations as side effects of file operations, and front-end replicated trees 505. File operations are performed in system 511 by kernel server 305(a). The messages produced by the functions in library 507 are carried to backup system 513 by pipe 710. Pipe 710 is provided to application process 503 by pipe process 711, which itself communicates with application process 503 by means of pipe 709. As will be described in more detail below, pipe process 711 provides a single pipe 710 which is used by all application processes 503 making backups on backup system 513.

Continuing with backup system 513, in the preferred embodiment, backend server 515 is divided into two processes: backend log process (BLP) 716 and system call engine (SYSCALL ENG) 715. Both use kernel server 305(b) to perform file operations. In addition to backup files, the file system maintained by kernel server 305(b) includes a log file 703(b).

Operation is as follows: when application process 503 is initialized, it obtains a file identifier from pipe process 711 which specifies pipe 710. When execution of application program 509 results in performance of a file operation, the function for the operation in lib.3d 507 both causes kernel server 305(a) to perform the function on the file system provided by kernel server 305(a) and also sends a message via pipe 710 to backup system 513. When the message arrives in backup system 513, it is received by backup log process 716, which logs the message in a log file 703(b) in the file system provided by kernel server 305(b). Whenever log file 703(b) has messages in it, the messages are read in the order in which they arrived by syscall engine process 715. In the preferred embodiment, backend map 517 belongs to syscall engine process 715. As syscall engine process 715 reads the messages, it causes kernel server 305(b) to perform the file operations required by the messages and itself maintains backend map 517 as required by the messages.

Fault-Tolerant Operation of System 701

Fault-tolerant operation of a system requires that faults be detected and that detected faults be responded to in a fashion which permits the system to continue operation. In the preferred embodiment, detection of faults and responses thereto are handled by WatchD, a user-level system for making a distributed system fault tolerant. WatchD is described in detail in Huang, Y. and Kintala, C., *Software Implemented Fault Tolerance: Technologies and Experiences,* 23rd International Conference on Fault Tolerant Computing (FTCS-23), Toulouse, France, Jun. 22–24, 1993, and is also the subject of U.S. Ser. No. 07/954,549, Y. Huang, *Apparatus and Methods for Fault Tolerant Computing,* filed 9/30/92 now abandoned. For purposes of the present discussion, it need only be understood that the WatchD system includes a library called libft and one monitor process on each node of the distributed system. libft contains routines for performing operations such as registering a process with WatchD, designating areas of memory for automatic backup, and performing checkpointing operations on those areas of memory. The monitor processes monitor user processes that are registered with WatchD and also monitor each other. When a monitor determines that a process registered with it has failed, the monitor restarts the process. A process may determine what happens when it is restarted by means of libft functions. In the course of monitoring a user process on one node of the distributed system, the monitor may move copies of crucial data (again defined by using libft functions) to another node of the distributed system. When the monitor's node fails, the monitor on the other node detects the failure and restarts the user process on the other node using current copies of the crucial data. When the failed node is restored, its monitor restarts the user process using the crucial information from the other node and sends a message indicating that the user process has been restarted. When the monitor in the other node receives the message, it terminates the user process running on its node. Typically, the WatchD monitors are arranged in a ring configuration, with each monitor monitoring its neighbor in the ring. The number of nodes in the ring and the number of monitors which receive copies of a user process's critical data determine how many nodes of the distributed system must fail before a user process registered with WatchD can no longer be restarted.

In the preferred embodiment, primary system 511 and backup system 513 each have a WatchD monitor. The relationships between the monitors and the components of system 701 are indicated by dashed arrows 721. The monitor for primary system 511 is monitor 717; as indicated by the dashed arrows 721, it watches pipe process 711, front-end log process 705, and monitor 719 in system 513. Monitor 719 watches monitor 717, syscall engine process 715, and backend log process 716.

As shown in FIG. 7, system 701 can deal with failures in front-end log process 705, pipe process 711, syscall engine 715, backend log process 716, and with a failure of system 513. The design of the part of system 701 which provides fault tolerance has two chief objectives:

To ensure that the overhead of recovery, in terms of performance, is minor.

To ensure failure and recovery are transparent to applications and that running applications are not terminated.

The recovery procedure is based on the assumption that WatchD is the most reliable component in the system. This is because it performs a very simple task and is capable of self-recovery after failure.

In the following, recovery from a failure of backup system 513 will be described in detail and an overview will be given of recovery from failures of the other processes. Beginning with the failure of backup system 513, in such a case, system 701 works as follows: when monitor 717 detects the failure of system 513, it notifies pipe process 711; pipe process 711 creates front-end log process 705 and replaces the file descriptor for pipe 710 with a file descriptor for pipe 707 to front-end log process 705. When the message function used by application process 503 detects the failure of pipe 710, it requests a new file descriptor for the pipe from pipe process 711. Pipe process 711 gives the message function the file descriptor for pipe 707 connected to front-end log process 705 and the messages sent by the message function go to frontend log process 705 instead of to backend log process 716. When frontend log process 705 receives the message, it places the message in log file 703(a) in primary system 511.

In a preferred embodiment, the message function detects the failure of pipe 710 as follows: Process 503 employs the TCP-IP protocol to send messages over pipe 710; in this protocol, a following message can be sent only if the previous message was received; thus, the message function used by the functions in library routine 507 sends messages via pipe 710 by sending two messages: the actual message and a dummy message; if the message function can send the dummy message, the actual message arrived. When system 513 fails, messages sent via pipe 710 do not arrive and the dummy message cannot be sent.

When backup system 513 recovers, monitor 719 restarts syscall engine 715 and backend log process 716 and then informs monitor 717. Monitor 717 informs pipe process 711, which obtains a file descriptor for pipe 710 and terminates frontend log process 705. When backend log process 716 restarts in system 513, it obtains a copy of logfile 703(a) from kernel server 305(a) and appends it to logfile 703(b). Syscall engine 715 then resumes execution of the messages in logfile 703(b).

The message function used by lib.3d gets the file descriptor for pipe 710 the same way it got the file descriptor for pipe 707. When the message function next attempts to use the file descriptor for pipe 707 to send a message, the attempt fails, and the message function again requests a pipe file descriptor from pipe process 711; this time, the message function receives the file descriptor for pipe 710 and is again connected to the back end.

The remaining failure scenarios are treated as follows:

Pipe process 722 fails:

Monitor 717 detects the failure and restarts the server. The newly restarted process retrieves the connection to pipe 710 from the process state saved by WatchD. No other processes are aware of this failure/recovery.

Syscall engine 715 fails:

Monitor 719 detects the failure and restarts syscall engine 715. With checkpoint and recovery functions provided by libft, the newly restarted syscall engine 715 is able to recover to its previously-checkpointed status from an external file. No other processes are aware of this failure/recovery.

Backend log process 716 fails:

Monitor 719 detects the failure and restarts backend log process 716. Again, process 716 restores its status from a checkpoint file. Monitor 719 further informs monitor 717 that backend log process 716 has been restarted, and monitor 717 in turn informs pipe process 711. Process 711 then connects pipe 710 to the new backend log process 716. The next write of each application fails and lib.3d gets the new connection from pipe process 711

Front-end log process 705 fails:

Front-end log process 705 exists only during periods of failure of system 513. When monitor 717 detects the failure of front-end log process 705, it informs pipe process 711. which then restarts front-end log process 705 and reconnects pipe 708 to it. The next write of application program 509 fails and the message sending function in lib.3d gets the file descriptor for the new pipe 708 from pipe process 711.

Implementation of User-level Namespace 405:
FIGS. 8–11

Figure 8:
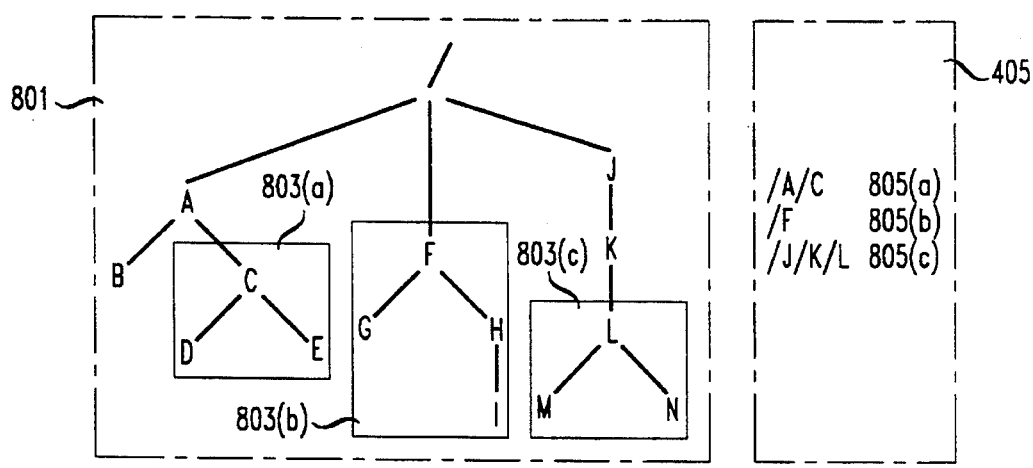
FIG. 8 is a diagram of the relationship between the namespace provided by kernel server 305(*a*) and the user-level namespace.

User-level namespace 405 can be used to specify any set of files from the file system provided by kernel server 305(a) to application process 503. FIG. 8 shows the relationship between namespace 801 of the file system provided by kernel server 305(a) and user-level namespace 405 in user-level backup file system 701.

In namespace 801, the file names are arranged in a tree. The files which make up the leaves of the tree (B,D,E,G,I, M,N) in FIG. 1 contain data or programs; the remaining files are lists of other files; such files are called directories. Any file in namespace 801 may be specified to kernel server 305(a) by means of a pathname which begins with the root, "/", and includes the names of all files from the root through the name of the file being specified by the pathname. Thus, the pathname for the file "D" is /A/C/D, and that for the file "L" is /J/K/L.

User-level backup file system 701 specifies the files to be backed up by specifying the subtree of namespace 801 which contains the files. Any operation on any file in the subtree which modifies the file is then performed on the backup file in backup system 513. In FIG. 8, four subtrees, 803(a), 803(b), and 803(c) have been selected to be backed up. Consequently, modifications to the data files D, E, G, I, M, or N in namespace 801 will result in modifications to the backup files for the data files, and modifications to the directories C, F, H, and L will similarly result in modifications to their backup files. Since all of the files in the subtree are backed up, the files to be backed up may be specified in user-level namespace 405 by means of the pathname of the directory which is the root of the subtree. Thus, subtree 803(a) is specified in user-level namespace 405 by means of the pathname/A/C 805(a).

Figure 9:
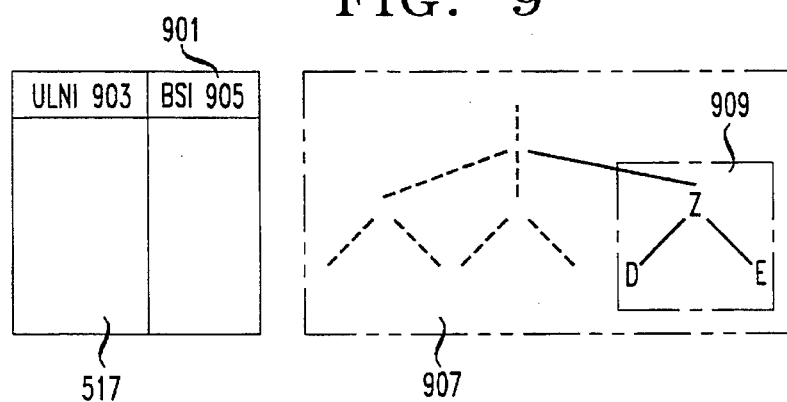
FIG. 9 is a diagram of the relationship between the user-level namespace and the namespace provided by kernel server 305(*b*)

Of course, user-level namespace 405 has also to be mapped to the file system provided by kernel server 305(b) to syscall engine 715. That is done in backend map 517. As shown in FIG. 9, backend map 517 contains an entry 901 for each open file in user-level namespace 405. The entry has two parts, user-level namespace information 903, which identifies the file in user-level namespace 405, and backup system information 905, which identifies the file in the file system provided by kernel server 305(b) which corresponds to the file identified by the user-level namespace information.

Backend map 517 permits mapping of subtrees of namespace 801 onto subtrees of namespace 907 for the file system which kernel server 305(b) provides to backend log process 716 and syscall engine 715. The mapping is done by mapping the pathname of the root of the subtree of namespace 801 onto the pathname of the root of the corresponding subtree of namespace 907. Tho pathname of the root is termed the prefix of the pathnames of the files within the subtree. Thus, the pathnames in subtree 803(a) have the prefix/A/C, and the pathname of file E within subtree 803(a) is E. In namespace 907, the subtree 909/Z is made to correspond to subtree 803(a) by mapping the prefix/A/C from namespace 801 to the prefix/Z of namespace 907. After the mapping has been done, a modification of the file specified by the pathname/A/C/E in namespace 801 will result in a modification of the file specified by the pathname/Z/E in namespace 907.

Figure 10:
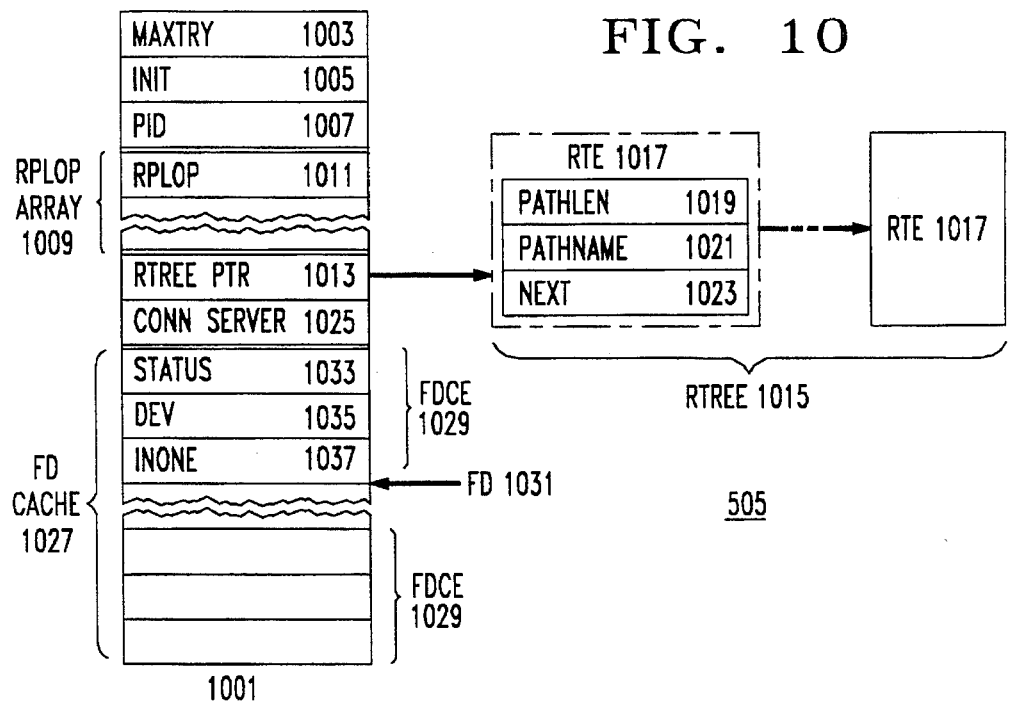
FIG. 10 is a detailed diagram of front-end replicated trees 505.
Figure 11:
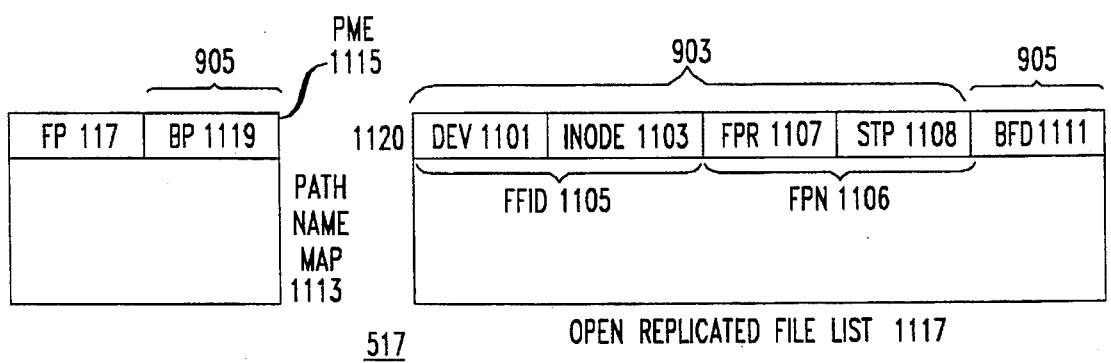
FIG. 11 is a detailed diagram of backend map 517.

Details of Front-End Replicated Trees 505: FIG. 10

In the preferred embodiment, user-level namespace 405 is implemented in front-end replicated trees 505. FIG. 10 shows the details of front-end replicated trees 505. The two main components of front-end replicated trees 505 are RTREE 1015, which is a linked list of the pathnames of the roots of the subtrees 803 whose files are to be backed up, and file descriptor cache 1027, which is an array which relates file descriptors to device and inode identifiers. The form of the implementation is a consequence of the fact that the file system provided by the UNIX operating system specifies files in three ways: by pathname, by means of an integer file descriptor, and by means of identifiers for the device upon which the file resides and the entry (inode) for the file in the UNIX file system tables. The file descriptor for the file is valid only for the process which opened the file and only while that process has the file open. The UNIX file system tables permit translations between the pathname and the device and inode and between the device and inode and the current file descriptor, but do not permit direct translation between the pathname and the current file descriptor.

Continuing in more detail, maxtry 1003 and init 1005 are used in initializing frontend replicated trees 505. maxtry 1003 indicates the number of times that the initialization function is to attempt to set up pipe 710 to backup system 513 before giving up; init 1005 indicates whether the pipe has been set up. RPLOP array 1009 is an array of the names 1011 of the operations which can be performed on replicated trees 505.

RTREE PTR 1013 is a pointer to the first element of RTREE list 1015, a linked list which contains one element 1017 for each replicated tree 803. Each element 1017 contains pathname 1021 for the root of the replicated tree 803, the length 1019 of pathname 1021, and a pointer 1023 to the next element in the linked list. Connection server 1025 is the pathname in namespace 801 of pipe 710 to backup system 513.

FD cache 1027 is an array of file descriptor cache entries 1029. There are as many entries 1029 in the array as there are file descriptors available to application process 503. The index of the entry for a given file descriptor in FD cache 1027 is the file descriptor. Entry 1029 contains a status flag which indicates whether the entry is currently valid and which also indicates whether application process 503 spawned a child while the file was open. Entry 1029 also contains identifier 1101 for the device upon which the file resides in primary system 511 and identifier 1103 for the inode for the file in primary system 511. There is a valid entry 1029 for each currently-open file in the subtrees 803 specified by the entries in RTREE 1015.

Details of Backend Map 517

Backend map 517 has two parts: pathname map 1113 and open replicated file list 1117. Pathname map 1113 simply maps pathnames in namespace 801 for primary system 511 onto pathnames in namespace 907 for backup system 513. Each entry 1115 in the map establishes a relationship between a frontend pathname 1117 and a backend pathname 1119. Included in pathname map 1113 are entries mapping the roots of subtrees 803 in frontend namespace 907 onto the roots of subtrees in namespace 907. Backend pathname 1119 is a part of backend system information 905. In a preferred embodiment, these mappings are specified in a system configuration file.

Open replicated file list 1117 contains an entry 1120 for each file which application process 503 currently has open in its replicated trees 803. User-level namespace information 903 in entry 1120 contains frontend file identifier (FFID_ 1105 and frontend pathname (FP) 1106. Frontend file identifier 1105 is made up of the device identifier and inode identifier for the file in primary system 511. Frontend pathname 1106 is divided into frontend prefix (FPR) 1107, which is the prefix for the file's subtree in frontend namespace 801, and subtree pathname 1108, which is the pathname for the file in its subtree. Backup system information 905 in entry 1117 consists of backend file descriptor 1111, which is the file descriptor in the file system provided by kernel server 305(b) for the file. In a preferred embodiment, backend map 517 is implemented as a hash table which is accessible both by frontend file identifier 1105 and by frontend path 1106.

Operations involving Data Structures 505 and 517

The following discussion will show how data structure 505 and 517 are created and how they are affected by various file operations. In a preferred embodiment, application process 503 runs on a UNIX operating system which employs the Korn shell. The Korn shell permits a process to set an ENV variable which specifies a file that is executed whenever the process invokes the Korn shell. The file specified by the ENV variable in application process 503 contains the information necessary for the application process 503 to construct and initialize frontend replicated table 505. Once created, table 505 is part of application process 503's address space and is available to any child process of application process 503 which is created with the fork system call of the UNIX operating system and thereby inherits its parent's environment. The exec system call, on the other hand, gives the child process a new environment. In order to make frontend replicated trees 505 available to children of application process 503 which are created with the exec system call, lib.3d includes an exec function which copies frontend replicated table 505 to the ENV variable for the new process, so that it is available to the process even though the process does not otherwise inherit its parent's address space. Other embodiments may employ a named pipe or even an external file to pass frontend replicated table 505 to a child process created by exec.

Continuing with the file operations, the first of these is the mount operation. In the UNIX operating system, mount adds a tree of names from a file system to the operating system's name space. In the preferred embodiment, the version of mount implemented in lib.3d includes a mode which causes a subtree of frontend namespace 801 to be added to user-level namespace 405 as a replicated tree 805. When mount is used in this mode, the pathname argument is the pathname of the root of the subtree 803 being added to user-level namespace 405. The function adds subtree 803 to user-level namespace 405 by making a replicated tree entry 1017 for the pathname and adding the entry to replicated tree 1015. There is also an unmount operation which removes replicated tree entry 1017 having the specified pathname from replicated tree 1015.

When application process 503 performs an open operation on a file in a replicated tree 805, the open function in lib.3d makes file descriptor cache entry 1029 for the newly-opened file and sends an open message to backend log process 716 which includes the pathname, device identifier, and inode identifier in primary system 511 of the file which has just been opened. When this message is executed by syscall engine 715, the result is the creation of an entry 901 in backend map 517. Pathname map 113 is used to find the file in backend system 513 which corresponds to the file in primary system 511 being opened and the file descriptor for the corresponding file is placed in backend file descriptor 1111.

Once a file is opened, file operations in primary system 511 employ the file descriptor to identify the file; messages for the corresponding operations on the backup files in backup system 513 employ the device identifier and the inode identifier to identify the file; to execute such a message, syscall engine 715 need only access entry 1119 in open replicated file list 1117 for the device and inode specified in the message. That entry contains the file descriptor 1111 needed to perform the operation in backup system 513.

When application process 503 closes a file in a replicated tree 505, the lib.3d close function determines from status field 1033 whether a child process may be using the file. If none can be, the close function invalidates the file descriptor cache entry 1029 for the file in replicated tree 505 and sends a close message containing the device identifier and the inode identifier to backup system 513. When syscall engine 715 executes the message, it uses the device and inode identifiers to locate the entry 1119 for the file. It then closes the file in backup system 513, using backend file descriptor 1111 to identify the file, and finally removes entry 1119 from open replicated file list 1117.

Conclusion

The foregoing Detailed Description has disclosed to those of ordinary skill in the art the best mode presently known to the inventors of making and using a user-level backup file system. As will be apparent to those skilled in the art, there are many ways of implementing user-level backup file systems which employ the principles of the user-level backup file system disclosed herein. For example, the preferred embodiment is implemented in systems running the UNIX operating system, and many details of the preferred embodiment reflect that fact; in implementations for other operating systems, those details would change. Similarly, the preferred embodiment employs the shared library system used in SunOS; other embodiments may employ other arrangements for dynamically linked libraries. Further, the data structures and messages disclosed herein may be implemented in many other ways which are functionally equivalent to those disclosed herein.

Moreover, the user-level backup file system is merely one example of how dynamically-linked replacement libraries may be used to modify the behavior of a process without modifying the application programs being executed by the process. The same techniques may be used to define a user-level namespace for a process which is different from the namespace provided to the process by the operating system and to attach not only file backup, but also other services to the names of entities in either the user-level namespace or the namespace which the operating system provides to the process.

Since the preferred embodiment is only one of many possible implementations of the principles of the invention, the foregoing Detailed Description is to be understood as being in every respect illustrative and exemplary, but not restrictive, and the scope of the invention disclosed herein is not to be determined from the Detailed Description, but rather from the claims as interpreted in light of the Detailed Description and with the full breadth permitted by the law.

What is claimed is:

1. Apparatus for selectively adding a side effect to an operation which is performed by executing a function in a dynamically-linked library, the apparatus comprising:

means for associating an indication that the side effect is to be added with the operation; and a dynamically-linked replacement library which replaces the dynamically-linked library and contains a replacement function, the replacement function performing the operation in the same manner as the function in the dynamically-linked library and further determining from the means for associating the indication whether the side effect is to be performed for the operation and performing the side effect when the means for associating the indication so indicates.

2. A file replication system comprising:

means for executing an application program which operates on a first file using a function from a first dynamically-linked library;

a second dynamically-linked library which replaces the first dynamically-linked library and contains a replacement function for the function from the first dynamically-linked library, the replacement function operating on the file in the same fashion as the function from the first library and further sending a message specifying another operation on another file which is substantially the same as the operation performed by executing the function from the first dynamically-linked library.

3. The apparatus set forth in claim 1 wherein:

the operation is an operation on an entity; and the means for associating associates the indication with the entity.

4. The apparatus set forth in claim 3 wherein:

the side effect is performing another operation on another entity.

5. The apparatus set forth in claim 4 wherein:

the operation is performed in a first system;

the other operation is performed in a second system; and the side effect sends a message to the second system specifying the other operation and the second system responds thereto by performing the other operation.

6. The apparatus set forth in claim 5 wherein:

the means for associating associates the indication with the entity by associating the indication with an identifier for the entity;

the apparatus further comprises means for mapping the identifier for the entity to an identifier for the other entity; and the message includes the identifier for the entity and the second system employs the means for mapping to obtain the identifier for the other entity.

7. The apparatus set forth in claim 6 wherein:

when the function from the dynamically-lined library has an effect on the identifier for the entity, the side effect includes altering the means for associating and the means for mapping as required by the effect on the identifier.

8. The apparatus set forth in claim 6 wherein:

the first system and the second system have separate name spaces.

9. The apparatus set forth in any of claims 5, 6, 7, or 8 wherein:

the operation is one of a sequence thereof; and the apparatus further comprises fault tolerant means for determining whether either the first system or the second system has failed and restarting the failed system;

first means responsive to the fault tolerant means for recording the sequence of operations which occur during the failure; and second means responsive to the fault tolerant means for performing the recorded sequence when the failed system is restarted.

10. The apparatus set forth in any of claims 3, 4, 5, 6, 7, or 8 wherein:

the entity is a file.

11. The apparatus set forth in any of claims 3, 4, 5, 6, or 8 wherein:

the other operation is substantially the same as that performed by executing the function in the dynamically-linked library.

12. The apparatus set forth in any of claims 3, 4, 5, 6, or 8 wherein:

the side effect includes modifying the means for associating an indication.

13. A storage medium which is readable by a computer system in which an operation is performed by executing code in a dynamically linked library, the storage medium being characterized in that:

the storage medium contains code which, when executed, implements the apparatus set forth in any of claims 1, 2, 3, 4, 5, 6, 7, or 8.

* * * * *